Patented Feb. 15, 1927.

1,617,514

UNITED STATES PATENT OFFICE.

DANIEL S. DONOVAN AND JOSEPH R. BROWN, OF DALLAS, TEXAS.

PROCESS OF PRODUCING COMMERCIAL BAKING DOUGH.

No Drawing.    Application filed July 6, 1926.   Serial No. 120,864.

This invention relates to new and useful improvements in processes of producing commercial baking dough.

The object of the invention is to produce a baking dough which may be sold and distributed to housewives and cooks ready for forming and baking, thus obviating the necessity of the housewife or cook mixing and preparing the dough.

A particular object of the invention is to produce a dough of a superior quality, which, when kept at the proper temperature, will retain its sweetness and palatability and which will not develop excessive acidity for a period ranging from one week to ten days.

Another object of the invention is to produce a commercial baking dough in which the baking powder will remain substantially inactive until the dough is rolled out for use or subjected to a temperature in excess of that at which it is delivered to the purchaser.

A still further object of the invention is to produce a commercial baking dough at a temperature lower than 60 degrees Fahrenheit.

Our invention will be more readily understood from a reading of the following specification, in which an example of the process is set forth.

In carrying out the process, we use milk, shortening, sugar, salt, yeast, white potatoes, baking soda, baking powder, and flour. These ingredients permit of certain variations and it is within the scope of the invention to vary the proportions as well as the ingredients.

We have found that the following ingredients and proportions produce a very satisfactory article, and in making the dough we proceed as follows:

30 quarts of raw unseparated sweet milk, suitably scalded, are employed to mix 10 pounds of shortening, such as lard or a suitable compound; 15 pounds of cane sugar; 2 pounds of salt; 1 pound of yeast, and 12 pounds of white potatoes. The potatoes are boiled, mashed and finely pulverized before being mixed with the foregoing ingredients.

The first step of the process involves the mixing of the above described ingredients with from 30 to 40 pounds of flour to produce a sponge dough, having substantially the consistency of cake dough. This dough is placed in a covered receptacle, preferably metal, and allowed to stand for about two hours, an even temperature of from 75 to 80 degrees Fahrenheit being maintained during this period. This constitutes the second step, inducing fermentation of the yeast, and a certain amount of aeration or raising of the dough.

After the sponge has stood, the next step is to place it in a suitable mixer and about 6 ounces of baking soda and 1 pound of baking powder to prevent souring are thoroughly mixed with the sponge dough. It has been found that a baking powder containing sodium bicarbonate, calcium acid phosphate, sodium aluminum sulphate, carbonate of magnesium, dried white of egg, and corn starch gives the best results. It is important that the baking powder remains dormant and inactive until the dough is heated in excess of 100 degrees Fahrenheit.

At the same time the soda and baking powder are added from 60 to 70 pounds of wheat flour are added and thoroughly mixed. The exact proportions of the flour will, of course, vary according to the grade used, but one skilled in the art will be easily able to select the right proportions. As with all such mixtures, some tests may be necessary in different localities to produce exactly the most desirable proportions.

It will be seen that as long as the baking powder is substantially dormant or inactive, the dough will retain its sweetness and will not spoil.

In order to keep the dough in proper condition and hold the baking powder substantially inactive, and to check fermentation it is necessary to maintain the dough at a low temperature. Therefore, after the batch has been thoroughly mixed it is placed in steel or metal troughs and chilled for a period of from 3 to 5 hours at a temperature ranging from 33 to 36 degrees Fahrenheit. This is the final step.

It is desirable that the dough, while being chilled, be kept moist, and, therefore, it should not be subjected to a circulation of dry air. With proper refrigeration, the dough can be chilled in 3 hours. The length of the chilling period can be determined by inserting a thermometer into the batch so that the bulb reaches the center. If the thermometer does not rise above 50 degrees Fahrenheit, the dough has been sufficiently chilled, because dough showing a temperature of 35 degrees Fahrenheit on its surface will have a higher temperature at its center. Chilling may be facilitated by division of the dough into smaller lots.

After the dough has been properly chilled, the batch is divided into suitable sized lumps or bricks and these are then placed in packages or other suitable boxes. A box having a paraffin coating on its inner surface or a wrapper of paraffin paper has been found satisfactory. It is very important that the low temperature be maintained and, therefore, as soon as the bricks have been wrapped they are placed in a refrigerator having the proper temperature.

In using the dough, the brick or lump is rolled out and the rolls, or other article, are cut therefrom, placed in the baking pans and the latter allowed to warm for 20 to 30 minutes on top of the oven. This will give the baking powder full opportunity to chemicalize and cause the dough to rise. The baking may then proceed in the usual manner.

It has been found that dough made in accordance with this process will retain its sweetness and lack of excessive acidity from one week to ten days, if kept in an ice-box, and may be used at will. While we have described certain ingredients and proportions, the same are subject to variation. The essential features of the invention reside in producing a suitable sponge dough, including potatoes or some other starch containing element, which is permitted to stand long enough to allow the yeast to set up fermentation.

The sponge dough is then mixed with the baking powder and soda and the remainder of the flour added. The baking powder is thus not subjected to a warm temperature and is not given an opportunity to become active. The soda neutralizes acidity.

The chilling is, of course, essential and we have found is the secret of the success of the dough.

It will be evident from the description that yeast fermentation is induced in the dough, and it is preferable that this process continue as nearly through the alcoholic fermentation as possible before the dough is chilled. In the chilled condition, the carbon dioxide generating agent, that is baking powder is inert, until the dough is again heated, while the alkali, that is the soda, neutralizes any excess acidity from the yeast fermentation. An important feature is the uniform chilling of the dough, and this is as before stated facilitated by division of the batch. In the formula given as an example, the potato weight is gross. The net weight suitable for the formula, that is after peeling and mashing will be about ten pounds. The yeast used in the formula given as an example will be from one to two pounds, depending upon circumstances, and this is true also regarding the baking soda which will usually be a little more than the amount stated.

What we claim is:

1. The process of making dough ready for baking without subsequent manipulation, which consists in mixing the ingredients, including yeast, for a sponge, ripening the sponge by subjecting it to a temperature sufficiently elevated to induce fermentation of the yeast, and maintaining such temperature until fermentation is substantially complete, adding an alkali and a chemical aerating agent substantially inert at the temperature of the sponge and at once reducing the temperature of the dough to a relatively low point before the agent can react, and maintaining the dough in such condition until ready for introduction into the oven, thus to prevent any reaction thereof prior to baking.

2. The process of making dough ready for baking without subsequent manipulation, which consists in mixing the ingredients, including yeast, for a sponge, ripening the sponge by subjecting it to a temperature sufficiently elevated to induce fermentation of the yeast, and maintaining such temperature until fermentation is substantially complete, adding an alkali and a chemical aerating agent substantially inert at the temperature of the sponge, and at once reducing the temperature of the dough to a relatively low point without substantial reduction of the moisture content thereof, before the agent can react, and maintaining the dough in such condition until ready for introduction into the oven, thereby to prevent any reaction thereof prior to baking.

In testimony whereof we affix our signatures.

DANIEL S. DONOVAN.
JOSEPH R. BROWN.